(12) United States Patent
Forrester

(10) Patent No.: US 9,038,309 B2
(45) Date of Patent: May 26, 2015

(54) WILDLIFE ATTRACTOR DEVICE

(71) Applicant: Harrison Forrester, Greenwood, SC (US)

(72) Inventor: Harrison Forrester, Greenwood, SC (US)

(*) Notice: Subject to any disclaimer, the term of this patent is extended or adjusted under 35 U.S.C. 154(b) by 0 days.

(21) Appl. No.: 13/948,694

(22) Filed: Jul. 23, 2013

(65) Prior Publication Data

US 2013/0305586 A1 Nov. 21, 2013

Related U.S. Application Data

(63) Continuation of application No. PCT/US2013/027690, filed on Feb. 25, 2013.

(60) Provisional application No. 61/602,805, filed on Feb. 24, 2012.

(51) Int. Cl.
*A01M 31/06* (2006.01)

(52) U.S. Cl.
CPC .................. *A01M 31/06* (2013.01)

(58) Field of Classification Search
CPC ...................................................... A01M 31/06
USPC ............................................................. 43/2
See application file for complete search history.

(56) References Cited

U.S. PATENT DOCUMENTS

| | | | | |
|---|---|---|---|---|
| 2,744,201 A | * | 5/1956 | Glaser | 310/32 |
| 3,995,580 A | * | 12/1976 | Serrone | 116/173 |
| 5,546,692 A | | 8/1996 | Byers | |
| 5,682,701 A | * | 11/1997 | Gammon | 43/2 |
| 5,692,328 A | * | 12/1997 | Pettit | 40/218 |
| 5,791,081 A | * | 8/1998 | Turner et al. | 43/2 |
| 5,884,427 A | * | 3/1999 | Lenz | 43/2 |
| 6,170,188 B1 | * | 1/2001 | Mathews | 43/3 |
| 6,357,159 B1 | * | 3/2002 | Bowling | 43/2 |
| D463,523 S | * | 9/2002 | McCombs | D22/125 |
| 6,487,810 B1 | | 12/2002 | Loughman | |
| 6,510,644 B1 | | 1/2003 | Gollnik | |
| 6,665,975 B2 | * | 12/2003 | Porter | 43/3 |
| 6,775,943 B2 | | 8/2004 | Loughman | |
| 6,901,693 B1 | * | 6/2005 | Crowe | 43/2 |
| 7,788,838 B2 | * | 9/2010 | Anthony | 43/2 |
| 2003/0106253 A1 | | 6/2003 | Loughman | |
| 2006/0064915 A1 | | 3/2006 | Cianciarulo | |
| 2006/0143968 A1 | * | 7/2006 | Brint et al. | 43/3 |

* cited by examiner

*Primary Examiner* — Darren W Ark
*Assistant Examiner* — Marc Burgess
(74) *Attorney, Agent, or Firm* — Amy Allen Hinson; John B. Hardaway, III; Nexsen Pruet, LLC

(57) ABSTRACT

A wildlife attractor device is disclosed. The wildlife attractor device may include a tail, a mounting surface positioned adjacent to the tail that is capable of mounting the attractor device to a support structure, and a control assembly connected to the tail. The control assembly is preferably capable of moving the tail between a first position and a second position thereby attracting the attention of wildlife such as a deer.

21 Claims, 6 Drawing Sheets

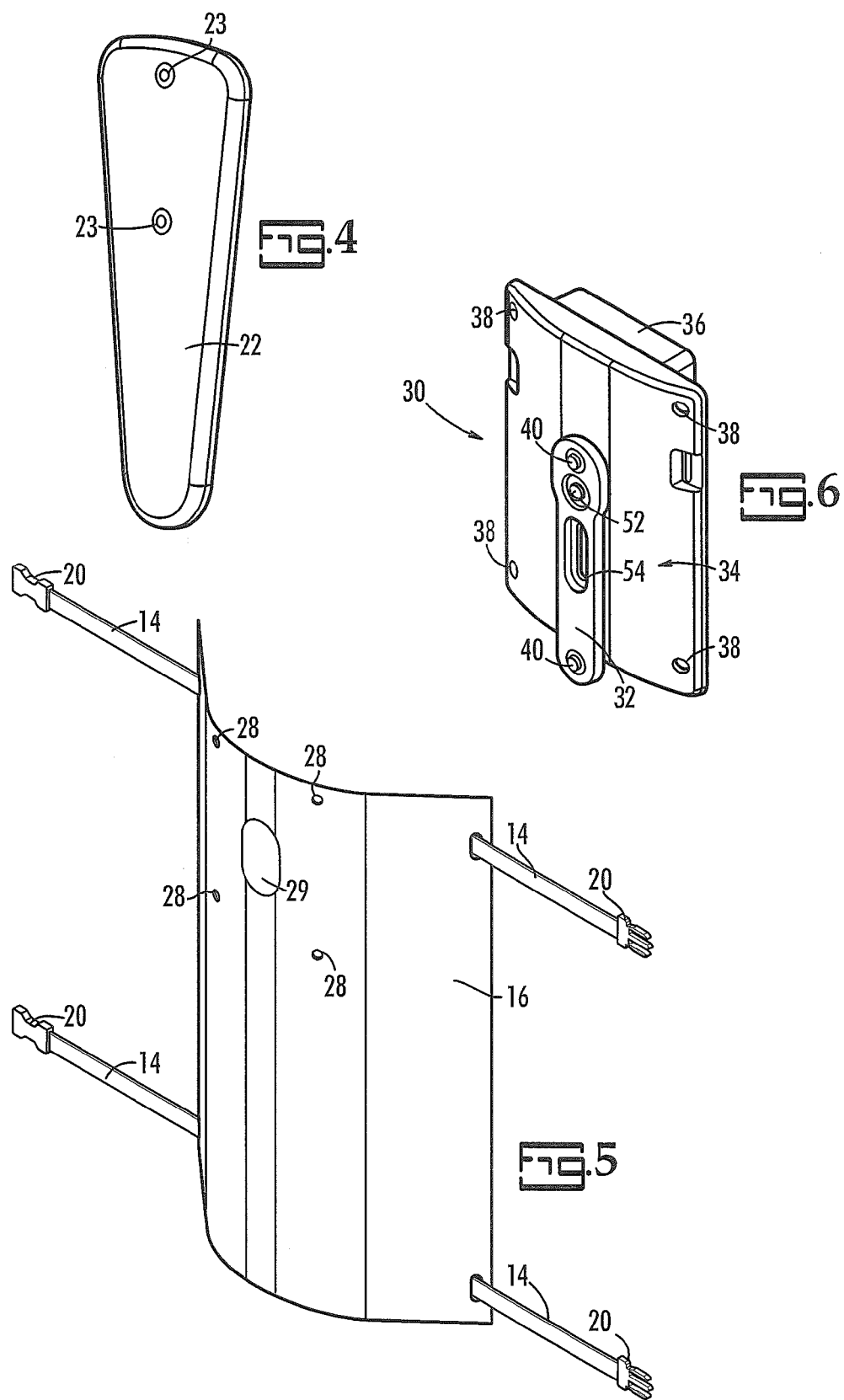

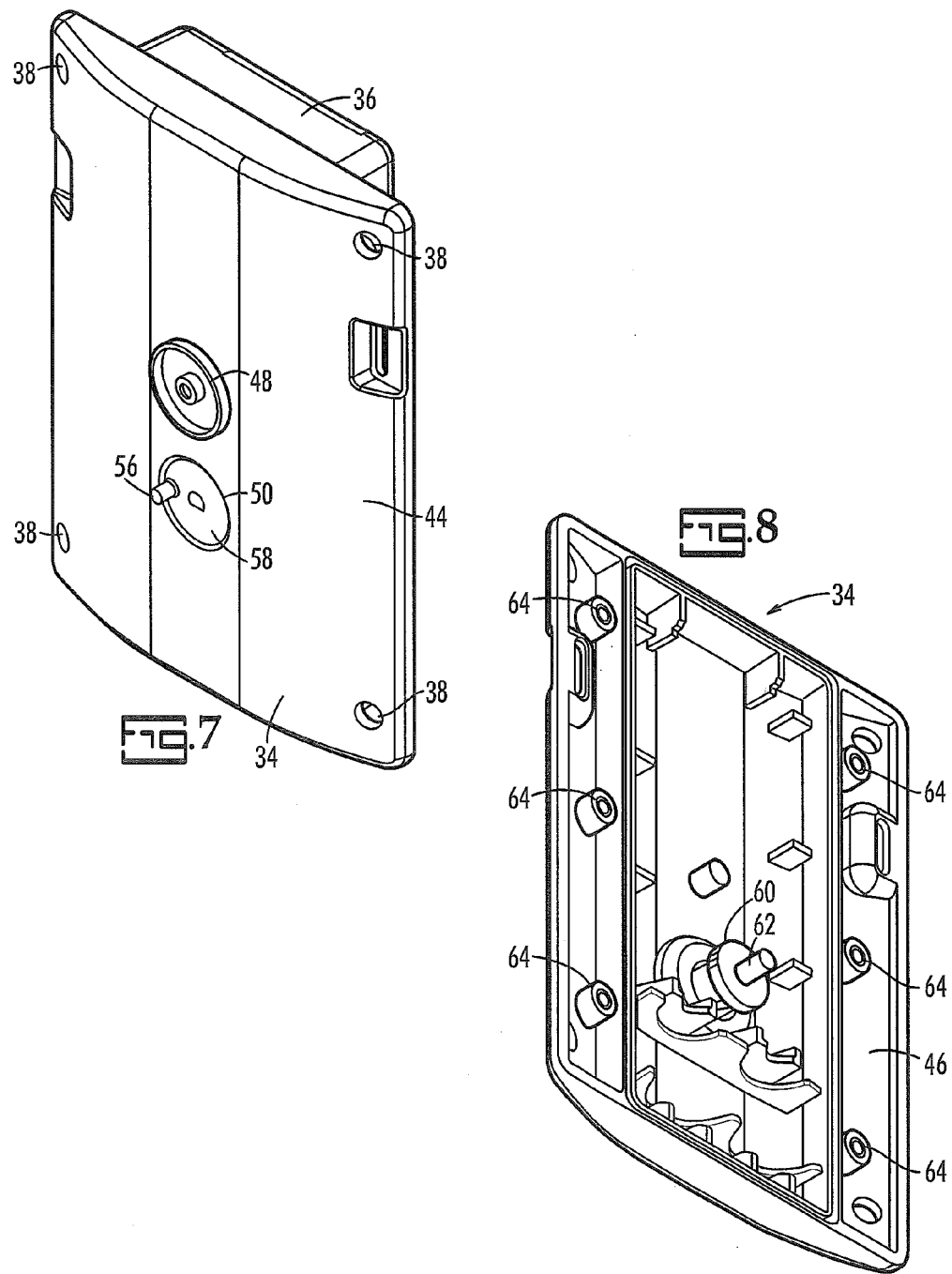

WILDLIFE ATTRACTOR DEVICE

BACKGROUND

The present invention discloses a hunting device and more particularly, a wildlife attractor device for strategically summoning wildlife and other animals such as deer, antelope, and varmints to a particular location.

Attracting wildlife and animals such as deer to a particular location has many benefits. For example, attracting wildlife to a particular location can aid scientists with their studies on a particular wildlife's migratory patterns. Furthermore, summoning wildlife, such as deer, to a particular location can assist with the widespread and age old activity and sport of hunting, which typically takes long grueling hours, if not days, to simply hunt down a single deer.

Thus there is a need in the art for an effective device capable of attracting wildlife and animals to a particular location.

SUMMARY

The present invention provides a wildlife attracting device. In one embodiment of the present invention, the device includes a tail, a mounting surface positioned adjacent to the tail, and a control assembly connected to the tail. The mounting surface is capable of mounting the attractor device to a support structure. Further the control assembly is capable of moving the tail between a first position and a second position.

In another embodiment of the present invention, the attractor device includes a tail capable of being mounted to a support structure and a control assembly. The control assembly includes a control unit for powering the control assembly; a motor controlled by the control unit and secured to a rotatable gear assembly; and an arm secured to the gear. The tail is affixed to the arm and the control assembly is capable of moving the tail.

BRIEF DESCRIPTION OF THE DRAWINGS

FIG. 4 is a perspective view of the back side of a tail of the wildlife attractor according to an embodiment of the present invention.

FIG. 5 is a perspective view of the mounting face with straps of the wildlife attractor according to an embodiment of the present invention.

FIG. 6 is a perspective view of the motor assembly of the wildlife attractor according to an embodiment of the present invention.

FIG. 7 is a perspective view of the motor assembly without a motion arm of the wildlife attractor according to an embodiment of the present invention.

FIG. 8 is a perspective view of the inside front casing of the motor assembly of the wildlife attractor according to an embodiment of the present invention.

DESCRIPTION OF REPRESENTATIVE EMBODIMENTS

The present invention is related to a hunting device that is particularly suitable for attracting wildlife and animals, such as deer, antelope, and varmints to a particular location. The unique design and features of the wildlife attracting device of the present invention preferably draws in the attention of the sought after wildlife for an extended period such as to allow a scientist to gather data or to allow a hunter enough time to aim and discharge his weapon. Although primarily described herein in terms of its use in assisting hunters with attracting wildlife to a particular location and aiding researchers with studies of a species of wildlife, the wildlife attractor of the present invention may be used for a myriad of other reasons. Furthermore, while the embodiment of the wildlife attractor that is primarily discussed herein is particularly suitable for attracting deer, it may also be used for attracting various other wildlife and animals and therefore the invention is not intended to be limited as such. The invention will be described with reference to the figures forming an integral non-limiting part of the instant specification. Throughout the description, similar elements will be numbered accordingly.

Figure 1:
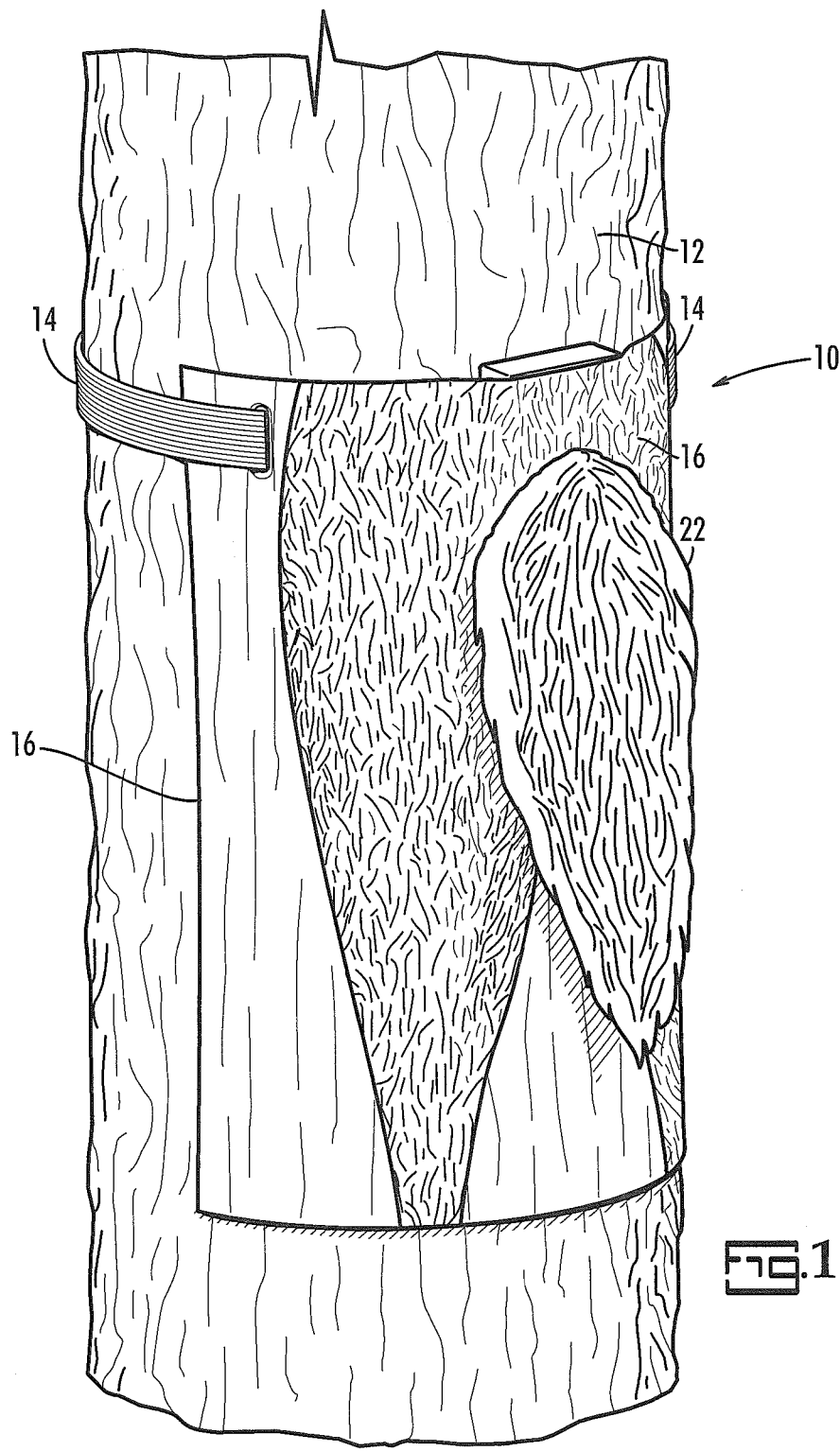
FIG. 1 is a perspective view of the wildlife attractor attached to a support structure according to an embodiment of the present invention.

FIG. 1 discloses an assembled view of an embodiment of the wildlife attractor device 10 of the present invention affixed to one side of a support structure 12 such as a tree, decoy, or pole apparatus, which may or may not be disguised to blend in with the environment. In this embodiment, the attractor device 10 is attached to the support structure 12 using adjustable strap 14. As shown in the exploded view of an embodiment of the attractor device of FIG. 2, the strap 14 extends through openings 18 on each side of a mounting surface or face 16 of attractor device 10 and hooks to the opposing side of the support structure 12 using clasp 20. In one embodiment, adjustable strap 14 is an 84 inch long by ½ inch wide polyester webbing strap and the clasp 20 is a cam buckle. In another embodiment, such as shown in FIG. 3, two straps 14 are used wherein one strap is positioned at the upper end of mounting face 16 and a second strap is positioned at the lower end of mounting face 16. The strap 14 may be a color such as natural brown, which blends with the surrounding environment. It will be understood that other configurations and devices for attaching the attractor device 10 to a support structure such as a tree, decoy, or pole are also contemplated and are within the scope of this invention. For example, in one embodiment, a mounting surface 16 may not be incorporated and another portion of the attractor device may be secured directly to a support surface.

Figure 2:
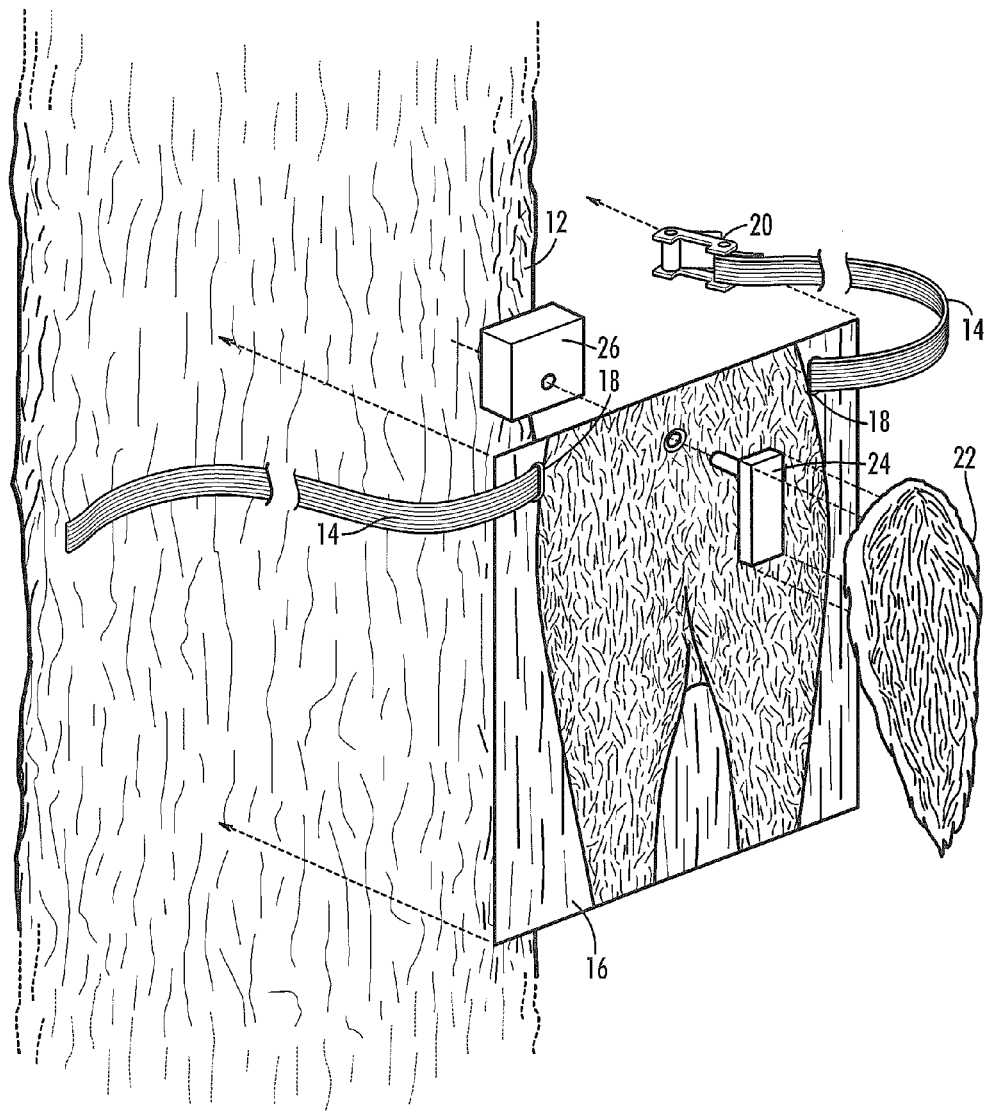
FIG. 2 is an exploded view of the wildlife attractor according to an embodiment of the present invention.
Figure 3:
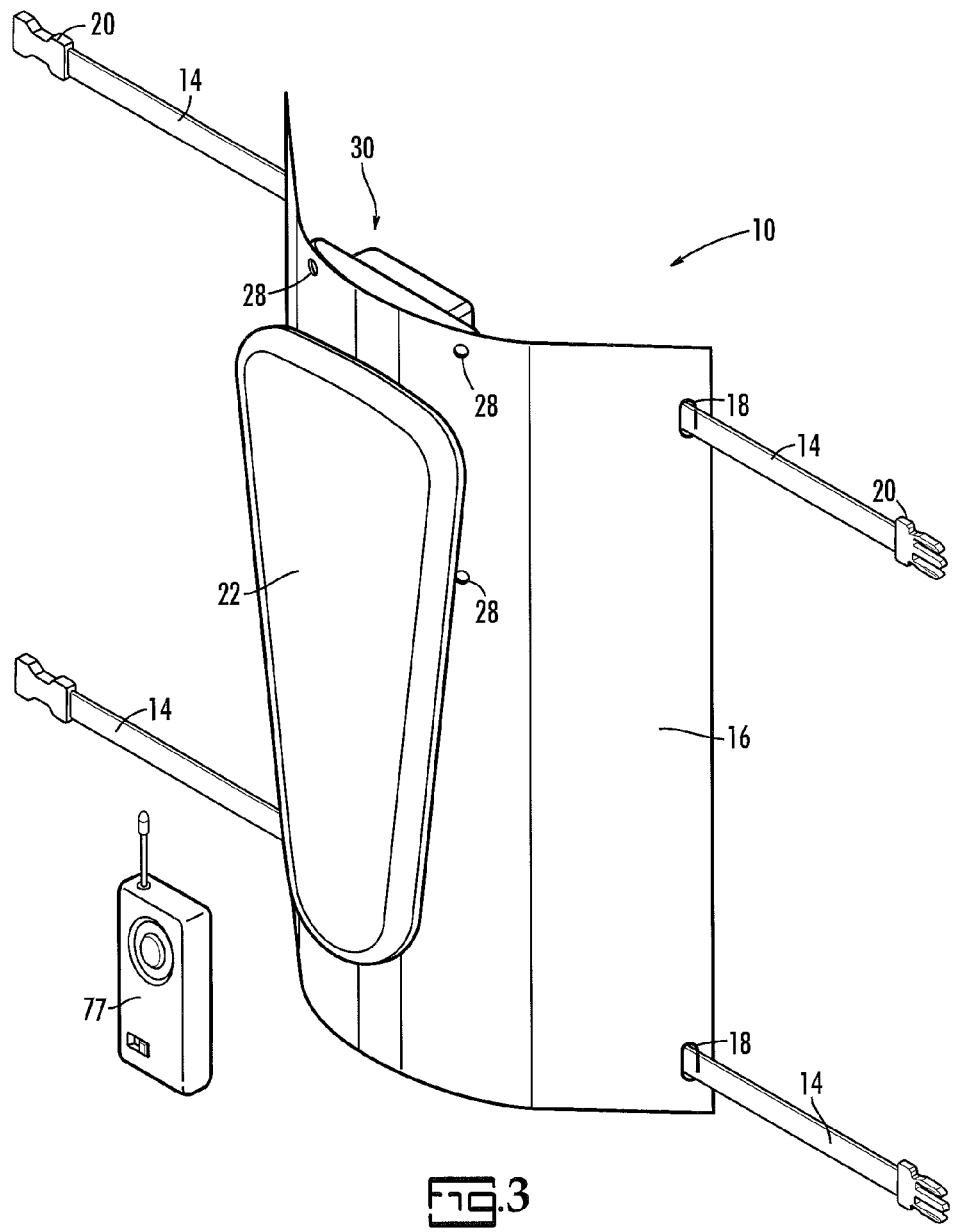
FIG. 3 is a perspective view of the wildlife attractor according to an embodiment of the present invention.

As shown in FIG. 2, attractor device 10 includes a tail 22 secured to a control assembly. In this embodiment, tail 22 is positioned adjacent to mounting face 16 and attached to an oscillating arm 24. The opposing end of the oscillating arm 24 extends through an opening in the mounting face 16, which is affixed to a motor assembly 26 allowing oscillating arm 24 and tail 22 to move from side to side. In one embodiment, the motor assembly 26 is controlled by a remote control having a trigger mechanism for manually allowing the arm 24 and tail 22 to move from side to side. In another embodiment, the motor assembly 26 is automatically controlled and set on a timer.

In an embodiment including a mounting face 16 for securing to a tree type support structure 12, the mounting face 16 may be approximately 12 inches by 16 inches. The mounting face 16 may or may not include a life-size reproduction or image of the tail side of an animal such as a deer. In one embodiment for use in connection with attracting a deer, the reproduction may be of a white tail deer tail. Preferably, the tail 22 is a three-dimensional tail. In one embodiment, a synthetic tail is used. In another embodiment, a reinforced fiber tail is used. In yet another embodiment, an embalmed tail is used.

The tail 22 is preferably positioned and dimensioned so that when it is affixed to mounting face 16, it appears to be the actual back side of the wildlife sought. For example, if a deer is sought, the mounting face 16 appears to be the actual backside of a life-size deer. Furthermore, the mounting face is preferably positioned on a support structure at approximately the same height as the height of the backside of the particular wildlife sought. The diameter of the support structure 12 such as a tree, decoy, or pole is preferably at least as large as the width of mounting face 16 if a mounting face 16 is used. For example, if the horizontal dimension of the mounting face is 12 inches, the diameter of the support structure 12 may also be at least 12 inches. Alternatively, the mounting face may be less than 12 inches to accommodate the display of the attractor device. If a mounting face 16 is not used, the horizontal dimension of the support structure 12 is preferably at least wide enough to secure the attractor device 10 to the support structure.

FIG. 3 discloses a further embodiment of the attractor device 10. Like the embodiment shown in FIGS. 1 and 2, this embodiment discloses a mounting face 16 having a tail 22 and openings 18 for insertion of straps 14. In this embodiment, two straps 14 are used to better secure the attractor device 10 to a support structure such as a tree, decoy, or pole. Further, the tail 22 in this embodiment is a mechanical tail that preferably includes a cover that looks and feels similar to a real tail, such as a deer tail.

The attractor device 10 of FIG. 3 further discloses a motor assembly 30. In the embodiment shown in FIGS. 3 through 6, motor assembly 30 includes a motion arm 32, a front casing 34, and a back casing 36. Motor assembly 30 is attached to mounting surface 16 such as by screws, plastic clips, or fasteners extending through openings 28 of mounting surface 16 and openings 38 of front casing 34 of motor assembly 30. Motor assembly 30 is also attached to tail 22. In this embodiment, motion arm 32 of motor assembly 30 is aligned with elongated opening 29 of mounting surface 16. As shown in FIG. 4, tail 22 includes openings 23 for insertion of axles 40 of motion arm 32 at elongated opening 29 of mounting surface 16.

FIG. 7 discloses the front of an embodiment of the motor assembly 30 of the present invention with the motion arm 32 removed. In this embodiment, the outer side 44 of the front casing 34 includes a motion arm connector 48 and a motion arm adjuster 50. Referring back to FIG. 6, motion arm 32 is attached to front casing 34 at motion arm connector 48 such as by axle 52. Preferably, the motion arm connector 48 firmly attaches motion arm 32 to front casing 34 while still allowing motion arm 32 to move from side to side and/or rotate with respect to axle 52. Motion arm 32 also may include an opening 54 and motion arm adjuster 50 of front casing 34 also may include a pin 56 affixed to a rotatable device such as a turntable 58. When motion arm 32 is attached to front casing 34, pin 56 of motion arm adjuster 50 is preferably positioned within opening 54 of motion arm 32. Thus, when turntable 58 rotates, pin 56 causes motion arm 32 to move from side to side and/or rotate with pin 56. In the embodiment disclosed in FIG. 6, opening 54 is elongated to assist and/or limit movement of motion arm 32 when pin 56 moves within opening 54.

Figure 9:
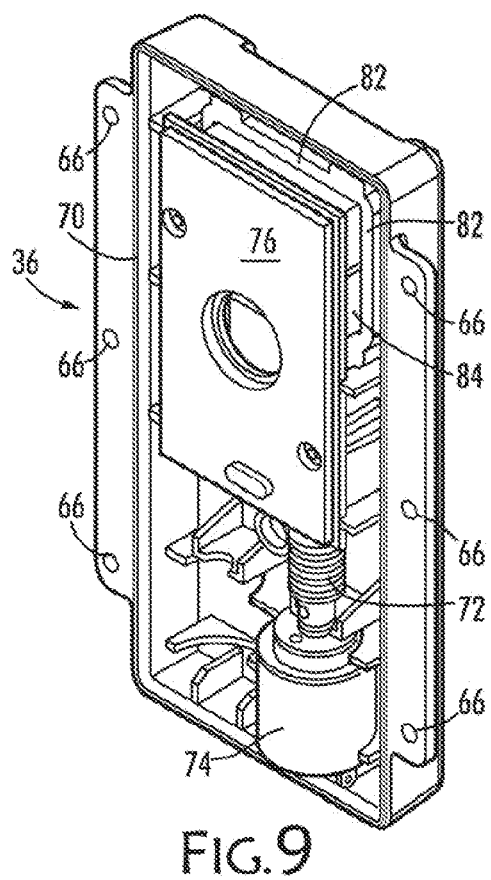
FIG. 9 is a perspective view of the inside back casing of the motor assembly of the wildlife attractor according to an embodiment of the present invention.

FIG. 8 discloses a detailed view of an embodiment of the inner side 46 of the front casing 34 of motor assembly 30. Front casing 34 may include a gear 60 surrounding a shaft 62, which is connected to motion arm adjuster 50. The inner side 46 of the front casing 34 may also include attaching devices such as openings 64 for attaching back casing 36 to front casing 34. For example, in the embodiment shown in FIG. 8, the inner side 46 includes six openings for attaching such as by screws to back casing 36. Likewise, as shown in FIG. 9, the back casing 36 includes respective openings 66 to the openings 64 of front casing 34. Axles such as screws can be positioned within the openings 64 and 66 to secure the front and back casings together. It will be understood that other attaching applications and devices may be used throughout this invention and are deemed part of this invention without departing from the scope thereof.

Figure 10:
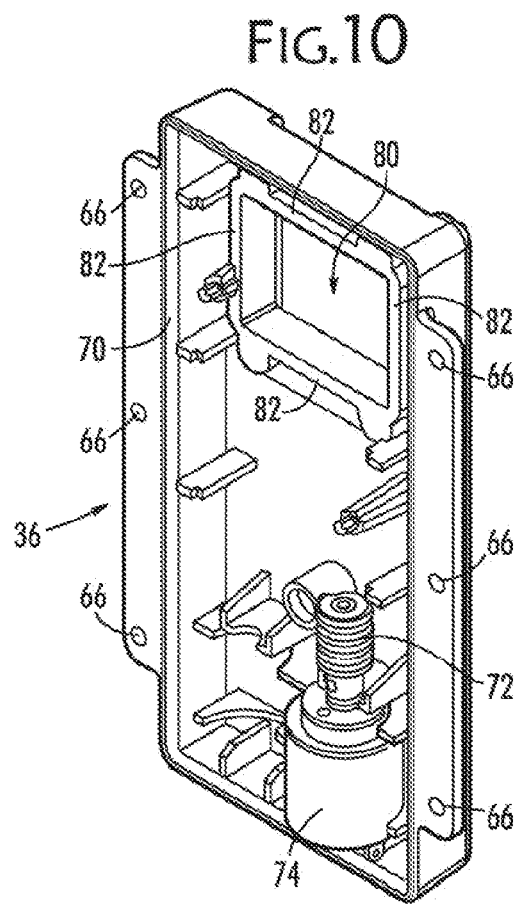
FIG. 10 is a perspective view of the inside back casing without the control unit of the motor assembly of the wildlife attractor accordingly to an embodiment of the present invention.

FIGS. 9 and 10 disclose detailed views of an embodiment of the inner side 70 of back casing 36 of motor assembly 30 of the present invention. In this embodiment, a gear coil 72, such as a worm gear, is used that corresponds with the gear 60 of front casing 34. Gear coil 72 is attached to a motor 74. Motor 74 is preferably attached to a control unit 76 that controls motor 74 and includes a power supply 84. In one embodiment the control unit 76 includes a control panel such as a printed circuit board that includes a battery as the power supply 84 for powering motor 74. In the example configuration shown in FIGS. 9 and 10, the back casing 36 may include walls 82 extending from the back wall of the back casing 36 to form a smaller interior compartment 80. In the embodiment of FIG. 10, four walls are shown. Moreover, the control unit 76 including the power supply 84 may be inserted into the interior compartment 80 to secure the control unit 76 and power supply 84 within the assembly 30. Further, in the embodiment disclosed in FIG. 3, the control unit 76 is operated by a remote control 77. Alternatively, the control unit 76 may be operated by a manual on/off switch.

In the embodiment disclosed in FIGS. 3 through 10, motor 74 is turned on causing gear coil 72 to rotate. When gear coil 72 rotates, the coils catch onto the gears of gear 60 causing gear 60 to also rotate. Because gear 60 is affixed to motion arm adjuster 50 via shaft 62, the turntable 58 and pin 56 also move respective to the movement of gear 60. As discussed above, pin 56 is inserted within opening 54 of motion arm 32 thereby causing motion arm 32 to move with pin 56. Tail 22 is affixed to motion arm 32 at axles 40 thereby causing tail 22 to also move in response to the movement of pin 56.

Because it may be preferable that the tail 22 only moves from side to side rather than rotating 365 degrees, the control unit 76 is preferably set so that tail 22 moves in a forward direction a certain degree of rotation and then moves in a backward direction a certain degree of rotation. For example, if the tail 22 is originally positioned vertically downward as shown in FIG. 3, control unit 76 may be set so that tail 22 moves in a clockwise direction 90 degrees and then moves counterclockwise 180 degrees. Alternatively, control unit 76 may be set so that tail 22 moves in a counterclockwise direction 45 degrees and then moves in a clockwise direction 90 degrees. The back and forth movement of the tail may be set to automatically repeat multiple times, to only move one back and forth cycle, or to only move one direction at a time. The degrees of rotations may also be set to vary between repetitions of tail 22 movements. Once motor 74 is turned off, tail 22 may remain in the last position or it may return to the position shown in FIG. 3.

When the tail moves from side to side, it may attract the attention of wildlife such as deer, antelope, or varmints thereby allowing time for taking photographs, conducting readings and studies, and/or securing a target for hunting the particular wildlife. The embodiment of FIGS. 1 and 2 discloses a deer tail and therefore the attractor device 10 of this embodiment may be most suitable for attracting deer.

It should be noted that there are several configurations suitable for the design of the wildlife attractor device and motor assembly of the present invention, and designs, materials, construction, and parts discussed above are for example only and represent but a few of these configurations. Other configurations altering the motion arm, gear, gear coil, motor, and control unit design could be employed to demonstrate the invention. Further, some of the elements of the motor assembly may not always be necessary to the invention. For example, in one embodiment the tail is attached directly to the front casing without the need for the motion arm. Alternatively, the gear and gear coil combination is substituted for another apparatus that allows movement of tail 22. Further, as shown in the embodiment of FIGS. 1 and 2, the motor assembly is a simple motor and oscillating arm construction. Thus, several configurations are suitable for the design of motor assembly and the combination of elements and the above described configuration is for example only and represents but a few configurations. Therefore, all configurations known in the art are intended to be encompassed by the present invention and the description and drawings should not be deemed to narrow the scope of the present invention in any way.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. An attractor device comprising:
    a tail;
    a mounting surface positioned adjacent to said tail, said mounting surface capable of mounting said tail to a support structure;
    and
    a control assembly connected to said tail, said control assembly capable of moving said tail between a first position and a second position, said control assembly comprises an arm for attaching to said tail and a unitary casing comprising a front casing and a back casing wherein said front casing is removably secured to said back casing to define an interior volume therebetween, said unitary casing comprises a control unit, a motor, and a power supply, wherein said control unit, motor, and power supply are enclosed within said interior volume of said unitary casing when said front and back casing are secured, said control unit controls said motor and said motor is connected to said arm, said front casing is adjacent to said mounting surface and said back casing comprising a smaller interior compartment formed from contiguous walls extending from the back wall of said back casing into the interior of the unitary casing, said power supply being inserted into said interior compartment for securing the power supply and the control unit within said unitary casing.

2. The attractor device of claim 1 wherein said tail is for attracting wildlife.

3. The attractor device of claim 2 wherein said tail is a reproduction of a deer tail and said attractor device is for attracting deer.

4. The attractor device of claim 3 wherein said mounting surface includes an image of a backside of a deer.

5. The attractor device of claim 1 wherein said mounting surface comprises a strap for attaching said tail to said support structure.

6. The attractor device of claim 1 wherein when said motor is on, said tail moves between said first position and said second position.

7. An attractor device comprising:
    a tail capable of being mounted to a support structure; and
    a control assembly connected to said tail, said control assembly comprises a unitary casing and an arm; said unitary casing comprising a front casing and a back casing, said unitary casing further comprising:
        a control unit for powering said control assembly;
        a motor controlled by said control unit and having a gear coil extending therefrom, said gear coil adjacent to a rotatable gear assembly; and
        a power supply;
    wherein said arm is secured to said gear assembly; said control unit, motor, and power supply are enclosed within said unitary casing, said back casing comprising a smaller interior compartment formed from contiguous walls extending from the back wall of said back casing into the interior of the unitary casing, said power supply being inserted into said interior compartment for securing the power supply and the control unit within said unitary casing,
    wherein when said motor is on and said tail is affixed to said arm, said gear coil rotates and connects with gears of said gear assembly causing said gear assembly to rotate, wherein when said gear assembly rotates, said arm rotates causing said tail to move.

8. The attractor device of claim 7 wherein said control assembly further comprises a motion arm adjuster having a turntable and a pin.

9. The attractor device of claim 8 wherein said arm moves respective to said pin.

10. The attractor device of claim 8 wherein said gear assembly comprises a shaft secured to said motion arm adjuster, said shaft causing said motion arm adjuster to move respective to said rotatable gear assembly.

11. The attractor device of claim 7 wherein said tail is for attracting wildlife.

12. The attractor device of claim 11 wherein said tail is a reproduction of a deer tail and said attractor device is for attracting deer.

13. The attractor device of claim 7 wherein said attractor device further comprises a mounting surface positioned adjacent to said tail and capable of mounting said tail to said support structure.

14. The attractor device of claim 13 wherein said mounting surface includes an image of the backside of an animal.

15. The attractor device of claim 13 wherein said mounting surface comprises a strap for attaching said tail to said support structure.

16. The attractor device of claim 7 wherein when said motor is on, said tail moves between a first position and a second position.

17. The attractor device of claim 16 wherein said control unit comprises a manual on/off switch.

18. The attractor device of claim 16 wherein said control unit is operated by a remote control.

19. The attractor device of claim 7 wherein said attractor device further comprises said support structure.

20. An attractor device comprising:
an arm;
a tail secured to said arm;
a control assembly connected to said arm and comprising a unitary casing having a front casing and a back casing wherein said front casing is removably secured to said back casing to define an interior volume therebetween, said unitary casing further comprising a control unit, a motor, and a power supply, wherein said control unit, motor, and power supply are enclosed within said interior volume of said unitary casing when said front and back casing are secured, said back casing comprising a smaller interior compartment formed from contiguous walls extending from the back wall of said back casing into the interior of the unitary casing, said power supply being inserted into said interior compartment for securing the power supply and control unit within said unitary casing, said control assembly capable of moving said tail between a first position and a second position; and
a remote control device for operating said control assembly;
wherein said tail looks like the tail of an animal and is for attracting wildlife.

21. The attractor device of claim 20 further comprising a mounting surface, wherein said front casing is adjacent to said mounting surface and said back casing is for positioning adjacent to a support structure.

* * * * *